(12) United States Patent
Tsirkin

(10) Patent No.: US 9,361,404 B2
(45) Date of Patent: Jun. 7, 2016

(54) OFFLINE RADIX TREE COMPRESSION WITH KEY SEQUENCE SKIP

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 207 days.

(21) Appl. No.: 14/272,441

(22) Filed: May 7, 2014

(65) Prior Publication Data

US 2015/0324484 A1 Nov. 12, 2015

(51) Int. Cl.
*G06F 17/30* (2006.01)

(52) U.S. Cl.
CPC .... *G06F 17/30961* (2013.01); *G06F 17/30153* (2013.01)

(58) Field of Classification Search
CPC .......................................................... G06F 17/30
USPC ................................................. 707/600–899
See application file for complete search history.

(56) References Cited

U.S. PATENT DOCUMENTS

| | | | |
|---|---|---|---|
| 5,946,679 A | 8/1999 | Ahuja et al. | |
| 6,067,574 A | 5/2000 | Tzeng | |
| 6,233,574 B1 * | 5/2001 | Ladwig | G06F 17/30961 707/741 |
| 6,594,655 B2 | 7/2003 | Tal et al. | |
| 6,662,184 B1 | 12/2003 | Friedberg | |
| 7,031,320 B2 | 4/2006 | Choe | |

FOREIGN PATENT DOCUMENTS

WO WO 0122667 3/2001

OTHER PUBLICATIONS

Viktor Leis et al., The Adaptive Radix Tree: ARTful Indexing for Main-Memory Databases, retrieved on May 6, 2014 from http://wwwkemper.informatik.tu-muenchen.de/~leis/papers/ART.pdf; 12 pages.
Arne Andersson et al., Efficient Implementation of Suffix Trees, Department of Computer Science, Software—Practice and Experience, 1995, 25(2):129-141.

(Continued)

*Primary Examiner* — Isaac M Woo
(74) *Attorney, Agent, or Firm* — Haynes and Boone, LLP

(57) ABSTRACT

Systems and methods are disclosed for compressing a radix tree. An example method of compressing a radix tree including a plurality of containers includes traversing a radix tree including a plurality of containers. The method also includes identifying, based on the traversing, a parent container that represents a sequence of elements and has a single immediate child container. The parent container includes a prefix of the sequence of elements that is represented by the parent container, and the immediate child container includes a single element. The method further includes determining whether a length of the sequence of elements that is represented by the parent container satisfies a container threshold. The method also includes when the length is determined to satisfy the container threshold, selecting one of the parent container and immediate child container, incrementing a length of the selected container, and removing the non-selected container from the radix tree.

20 Claims, 7 Drawing Sheets

(56) References Cited

OTHER PUBLICATIONS

Roberto Grossi et al., Compressed Suffix Arrays and Suffix Trees with Applications to Text Indexing and String Matching, retrieved on May 6, 2014 from https://kuscholarworks.ku.edu/dspace/bitstream/ 1808/7177/1/vitter_2005.pdf, pp. 378-407, SIAM J. Comput. vol. 35, No. 2, © 2005 Society for Industrial and Applied Mathematics.

Suffix Trees, retrieved on May 6, 2014 from http://www.cs.ucf.edu/~shzhang/Combio11/lec3.pdf, 55 pages.

* cited by examiner

OFFLINE RADIX TREE COMPRESSION WITH KEY SEQUENCE SKIP

BACKGROUND

The present disclosure generally relates to a radix tree, and more particularly to compressing a radix tree.

A radix tree is a data structure that is used to store data. A radix tree may be useful for constructing associative arrays with keys that can be expressed as strings and typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix.

BRIEF SUMMARY

This disclosure relates to compressing a radix tree. Methods, systems, and techniques for compressing a radix tree are provided.

According to an embodiment, a method of compressing a radix tree including a plurality of containers includes traversing a radix tree including a plurality of containers. The method also includes identifying, based on the traversing, a parent container that represents a sequence of elements and has a single immediate child container. The parent container includes a prefix of the sequence of elements that is represented by the parent container. The immediate child container includes a single element. The method further includes determining whether a length of the sequence of elements that is represented by the parent container satisfies a container threshold. The method also includes when the length is determined to satisfy the container threshold, selecting one of the parent container and immediate child container, incrementing a length of the selected container, and removing the non-selected container from the radix tree.

According to another embodiment, a system for compressing a radix tree including a plurality of containers includes a traverser that traverses a radix tree including a plurality of containers and identifies, based on the traversal of the radix tree, a parent container that represents a sequence of elements and has a single immediate child container. The parent container includes a prefix of the sequence of elements that is represented by the parent container, and the immediate child container includes a single element. The system also includes a compressor that determines whether a length of the sequence of elements that is represented by the parent container satisfies a container threshold. When the length is determined to satisfy the container threshold, the compressor selects one of the parent container and immediate child container, increments a length of the selected container, and removes the non-selected container from the radix tree.

According to another embodiment, a non-transitory machine-readable medium includes a plurality of machine-readable instructions that when executed by one or more processors are adapted to cause the one or more processors to perform a method including: traversing a radix tree including a plurality of containers; identifying, based on the traversing, a parent container that represents a sequence of elements and has a single immediate child container, the parent container including a prefix of the sequence of elements that is represented by the parent container, and the immediate child container including a single element; determining whether a length of the sequence of elements that is represented by the parent container satisfies a container threshold; and when the length is determined to satisfy the container threshold: selecting one of the parent container and immediate child container; incrementing a length of the selected container; and removing the non-selected container from the radix tree.

BRIEF DESCRIPTION OF THE DRAWINGS

The accompanying drawings, which form a part of the specification, illustrate embodiments of the invention and together with the description, further serve to explain the principles of the embodiments. Embodiments of the present disclosure and their advantages are best understood by referring to the detailed description that follows. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Example Radix Tree
  B. Traverse the Radix Tree
  C. Compress the Radix Tree
    1. Identify Containers to Combine
    2. The Parent Container is Selected
    3. Continue the Traversal of the Radix Tree
    4. The Immediate Child Container is Selected
    5. Continue the Traversal of the Radix Tree
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A radix tree may store one or more keys. If the radix tree stores a key that starts with 100 "0"s, the radix tree may have a depth of 100, stretching down to 100 levels. After the first 100 levels, the path may branch out. It may be time consuming to traverse the radix tree following a single path for 100 levels. It may be desirable to compress the radix tree.

Further, keys stored in the radix tree may have different lengths. To implement such a radix tree, memory to store the radix tree may be dynamically allocated or may be pre-allocated to ensure that sufficient memory is available to store the longest possible key for each node in the radix tree. Dynamically allocating memory and pre-allocating memory for a radix tree may have performance issues.

Unless specifically stated otherwise, as apparent from the following discussion, it is appreciated that throughout the description, discussions utilizing terms such as "receiving", "identifying", "traversing", "determining", "selecting", "incrementing", and "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
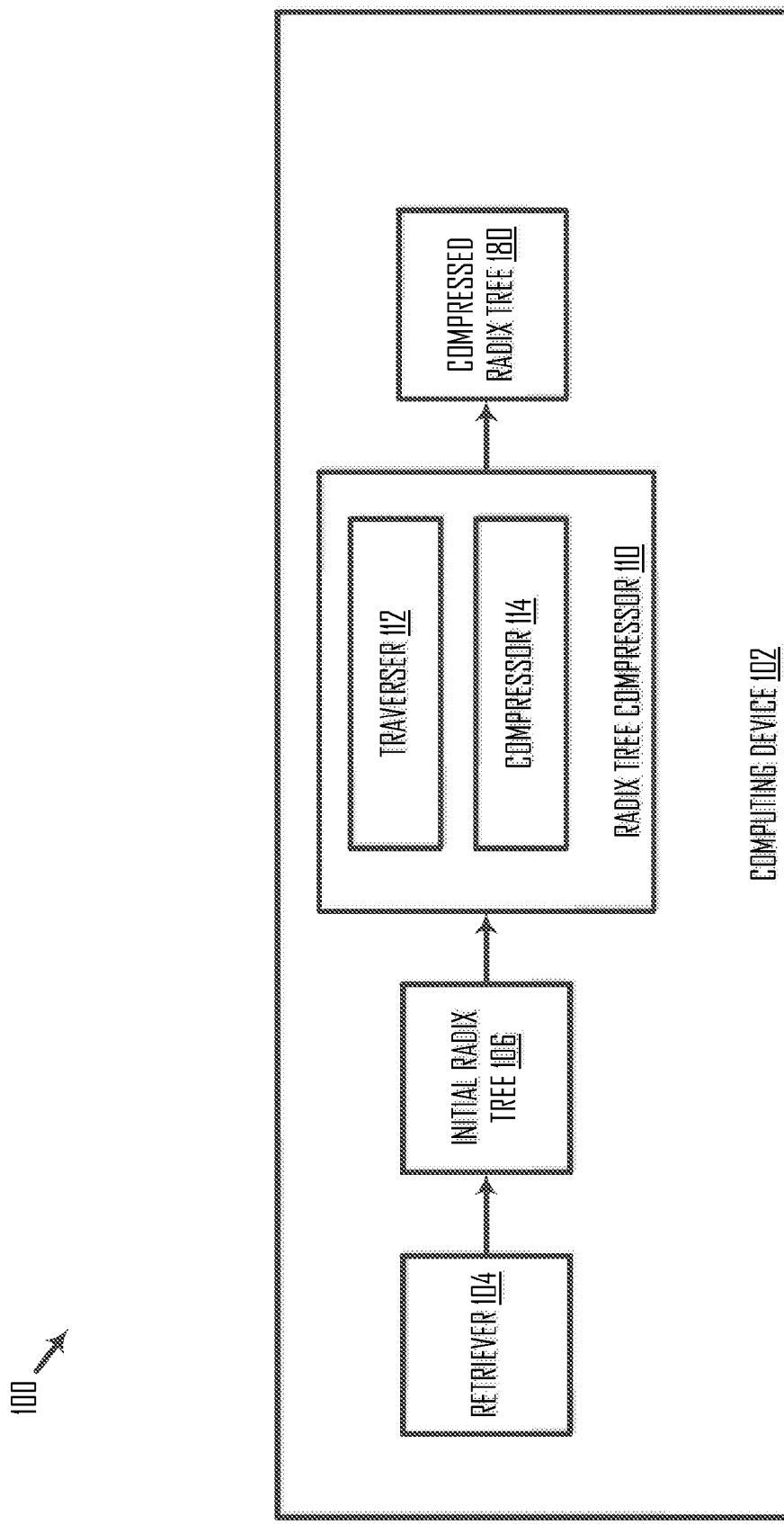
FIG. 1 is a block diagram illustrating a system for compressing a radix tree including a plurality of containers, according to an embodiment.

FIG. 1 is a block diagram 100 illustrating a system for compressing a radix tree including a plurality of containers, according to an embodiment. Diagram 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

FIG. 1 also includes a retriever 104 and a radix tree compressor 110. Each of retriever 104 and radix tree compressor 110 is executable on computing device 102. Retriever 104 or radix tree compressor 110 may receive an instruction to compress an initial radix tree 106. Retriever 104 retrieves initial radix tree 106 stored in memory. A radix tree includes one or more containers and stores one or more keys. Initial radix tree 106 may include containers that have zero or more children. A node has a one-to-one relationship with an incoming edge, and the container may be a node or an edge of the radix tree. A key includes a sequence of elements. An element may be, for example, a symbol, character, letter, number, or bit. Other elements are within the scope of the disclosure.

The key may map to a value that is referenced by a leaf container in the radix tree. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the radix tree may be used to index words in a text document.

Radix tree compressor 110 traverses initial radix tree 106 and compresses it, thereby creating a compressed radix tree 180. In an example, radix tree compressor 110 compresses initial radix tree 106 offline. In an example, after the initial radix tree stores the keys and is complete, radix tree compressor 110 traverses and compresses the initial radix tree.

A. Example Radix Tree

Figure 2A:
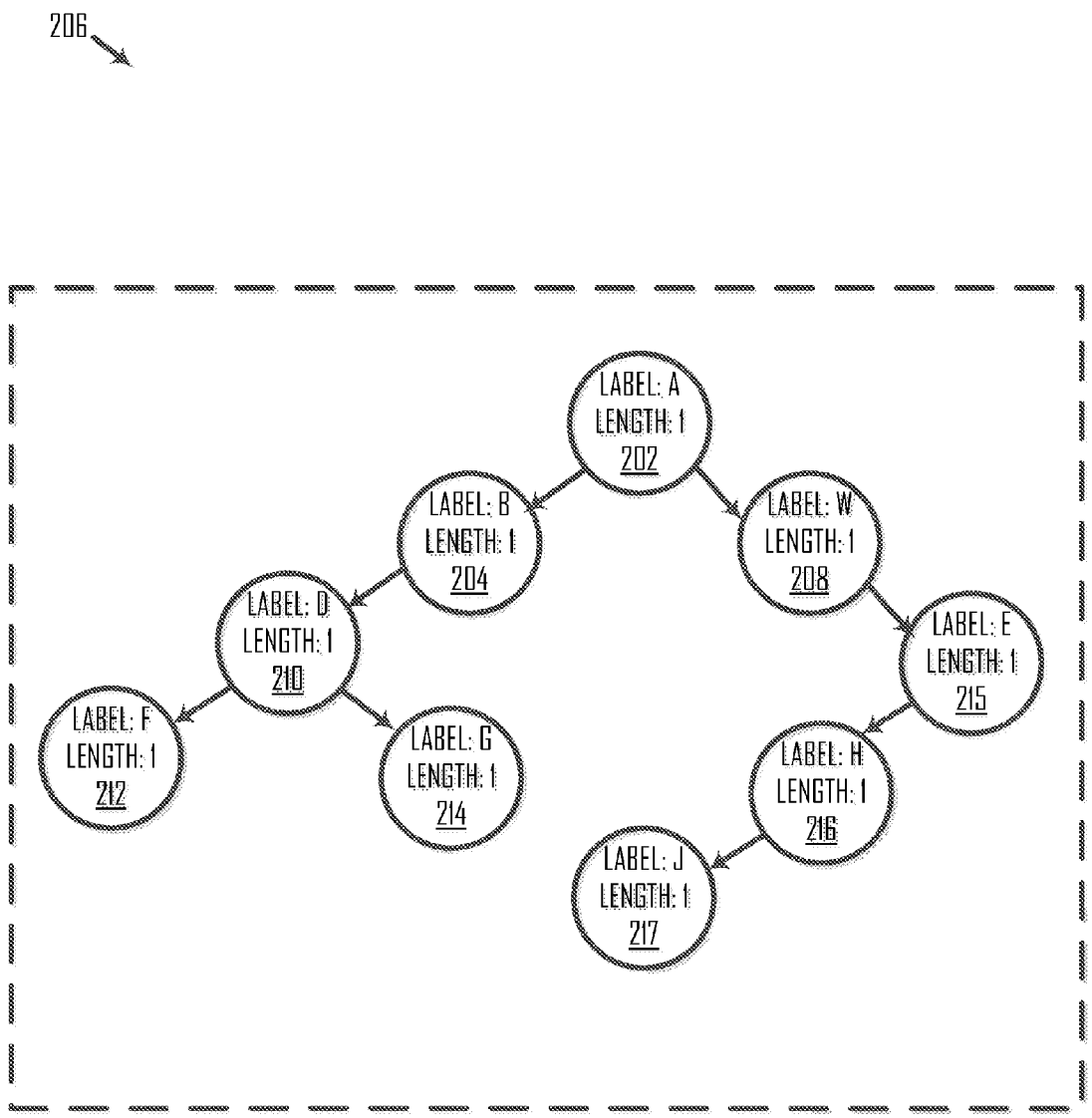
FIG. 2A is a block diagram illustrating an initial radix tree including a plurality of containers, according to an embodiment.
Figure 2B:
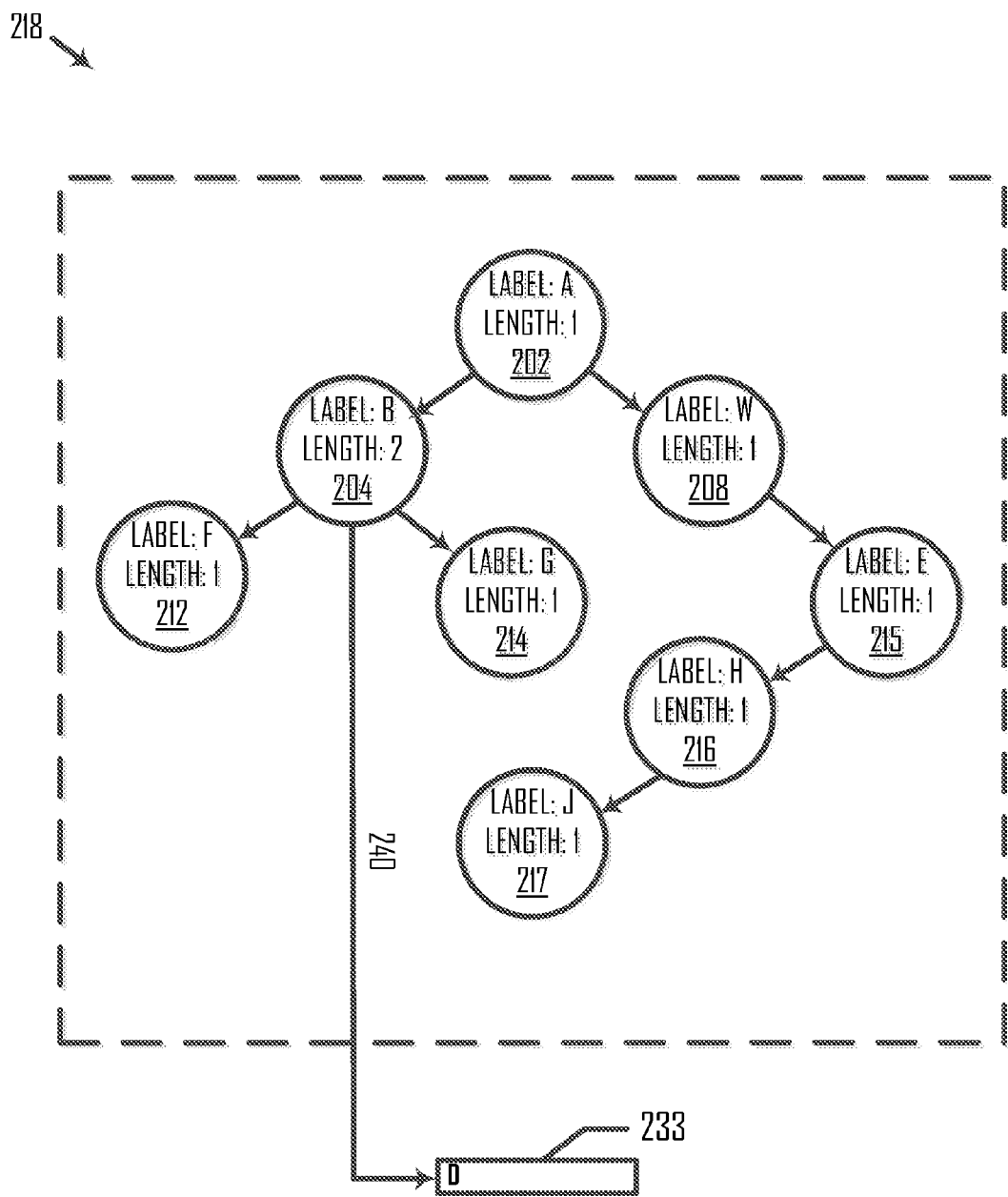
FIG. 2B is a block diagram illustrating a first intermediate radix tree resulting from the compression of the initial radix tree in FIG. 2A, according to an embodiment.
Figure 2C:
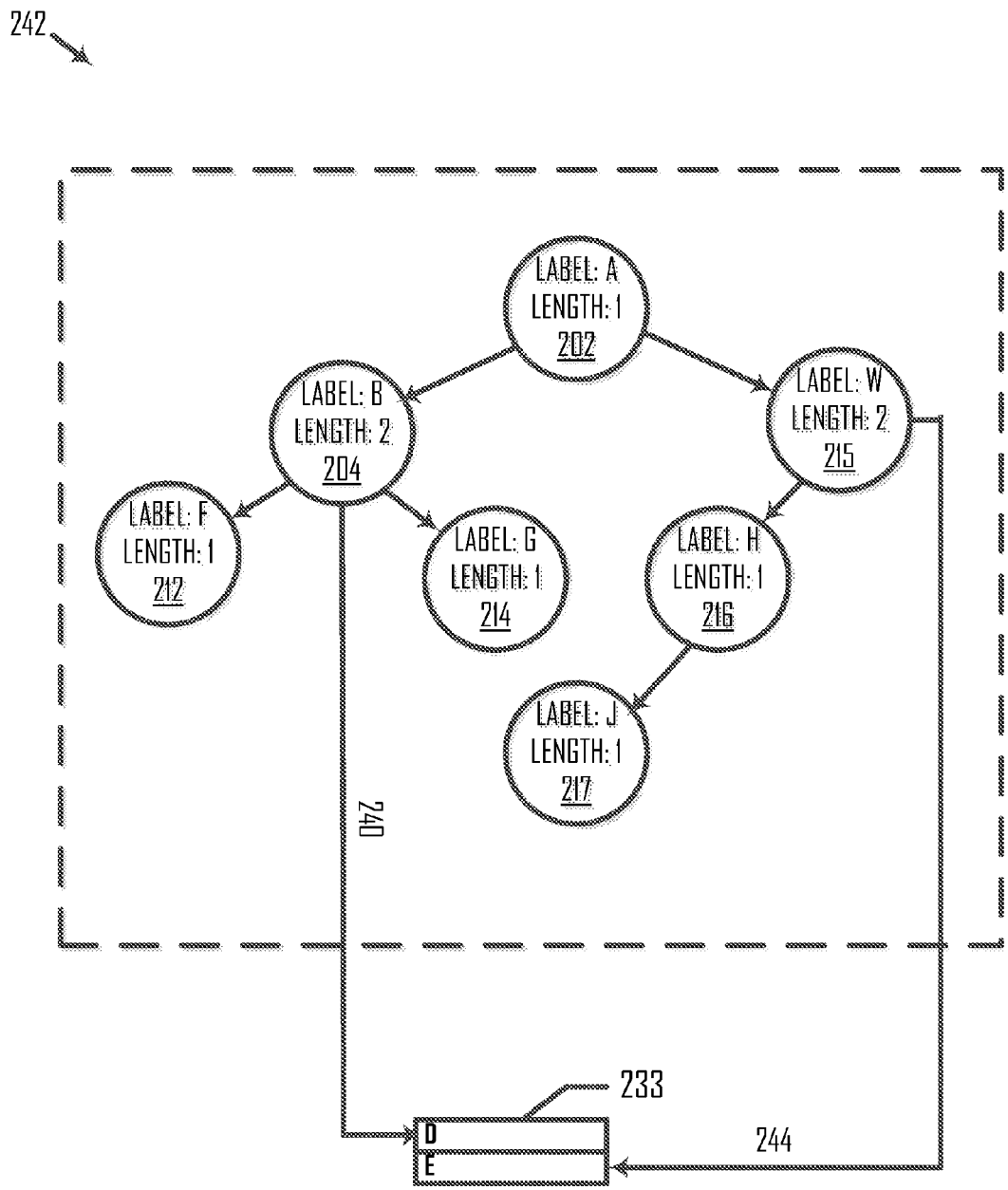
FIG. 2C is a block diagram illustrating a second intermediate radix tree resulting from the compression of the first intermediate radix tree in FIG. 2B, according to an embodiment.
Figure 2D:
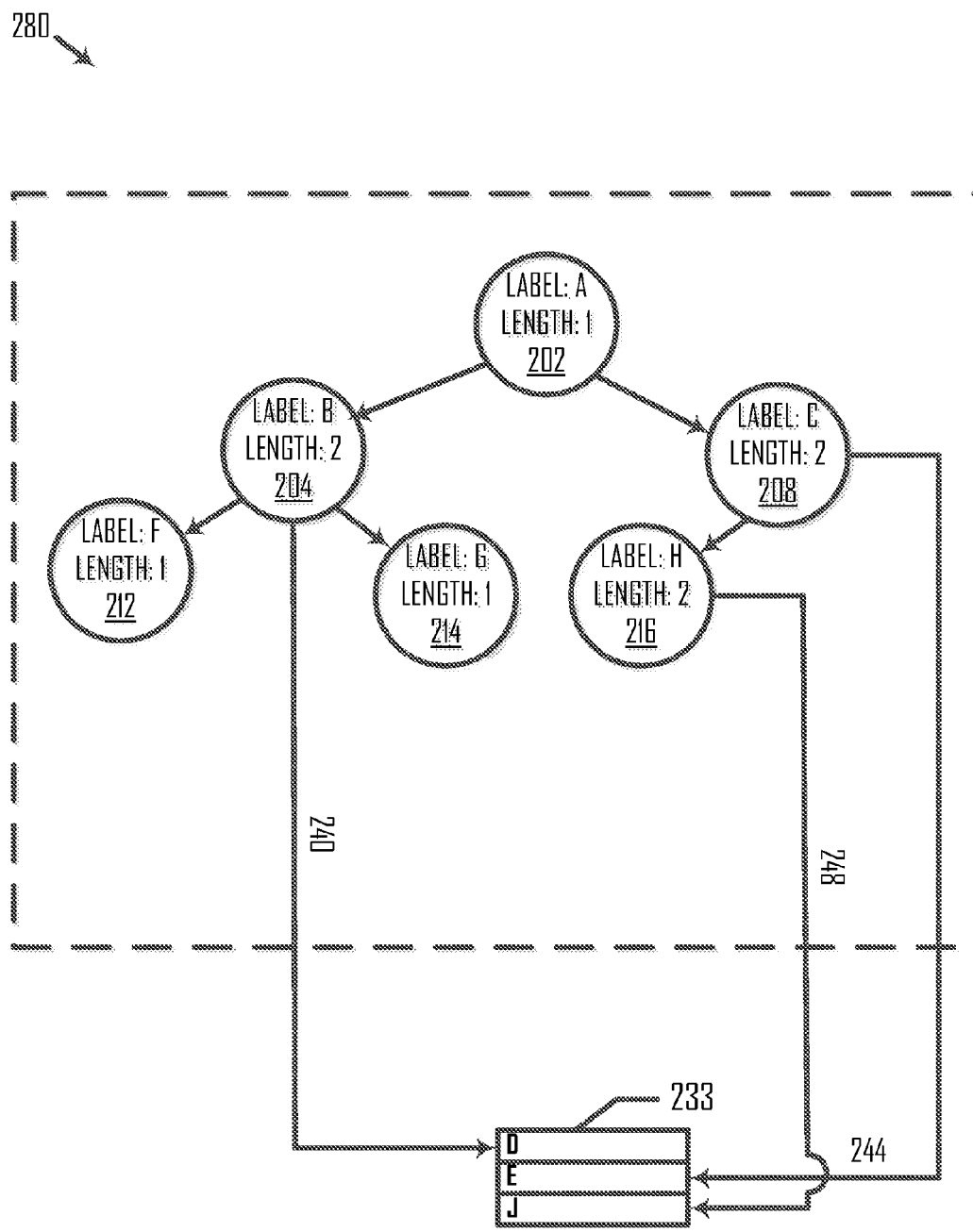
FIG. 2D is a block diagram illustrating a compressed radix tree resulting from the compression of the intermediate radix tree in FIG. 2C, according to an embodiment.

FIG. 2A is a block diagram illustrating an initial radix tree 206 including a plurality of containers, according to an embodiment. FIG. 2B is a block diagram illustrating an intermediate radix tree 218 resulting from the compression of initial radix tree 206 in FIG. 2A, according to an embodiment. FIG. 2C is a block diagram illustrating an intermediate radix tree 242 resulting from the compression of intermediate radix tree 218 in FIG. 2B, according to an embodiment. FIG. 2D is a block diagram illustrating a compressed radix tree 280 resulting from the compression of intermediate radix tree 242 in FIG. 2C, according to an embodiment. The description below will refer to FIGS. 2A-2D together to explain in further detail how radix tree compressor 110 compresses initial radix tree 206 to thereby create compressed radix tree 280.

In FIG. 2A, initial radix tree 206 includes one or more containers and stores one or more keys. Each container in initial radix tree 206 has zero or more children and may represent a sequence of elements. Additionally, each container may include one or more fields. In an example, a container includes a label field and a length field. A container's label field may have as its value a prefix of a sequence of elements that is represented by the container. The length of the prefix may be up to a prefix threshold. The prefix threshold enables the number of elements included in a container to be limited. The smaller the prefix threshold is the fewer elements that can be stored in a container. In contrast, the larger the prefix threshold is the more elements that can be stored in the container. It may be desirable to limit the number of elements that can be stored in a container to limit the size of the container. The value of a container's label field may be the container's prefix.

A container's length field may have as its value the length of the sequence of elements that is represented by the container. The value of a container's length field may be referred to as the container's length and may identify the number of elements that the container represents. A container may represent one or more elements. One or more elements represented by a container may be "skipped" or removed and represented in the container's length, as will be discussed further below.

Initial radix tree 206 includes a root container 202. Root container 202 is located at a depth of zero in initial radix tree 206 and includes a single element "A", which is container 202's label field value and is a prefix of a sequence of elements "A" that is represented by container 202. Root container 202's length field value is one, which is the length of the sequence of elements that is represented by container 202. The length of the prefix may be up to a prefix threshold. The prefix threshold may be any whole number greater than zero.

Root container 202 has two immediate children, containers 204 and 208, which are located at a depth of one in initial radix tree 206. An immediate child container of a parent container refers to a direct edge relationship between two containers. The immediate child may be located one depth level below the parent container. In an example, containers 204 and 208 are immediate children of root container 202. A single edge connects root container 202 to container 204, which is one depth level below root container 202. In contrast, although container 210 is a descendant of root node 202, container 210 is not an immediate child container of root node 202. A single edge does not connect root container 202 to container 210, which is more than one depth level below root container 202.

Container 204 includes a single element "B", which is container 204's label field value and is a prefix of a sequence of elements "B" that is represented by container 204. Container 204's length field value is one, which is the length of the sequence of elements "B" that is represented by container 204. Container 208 includes a single element "W", which is container 208's label field value and is a prefix of a sequence of elements "W" that is represented by container 208. Container 208's length field value is one, which is the length of the sequence of elements "W" that is represented by container 208.

Container 204 has a single immediate child, container 210, which is located at a depth of two in initial radix tree 206. Container 210 includes a single element "D", which is container 210's label field value and is a prefix of a sequence of elements "D" that is represented by container 210. Container 210's length field value is one, which is the length of the sequence of elements "D" that is represented by container 210. Container 210 has two immediate children, containers 212 and 214, which are located at a depth of three in initial radix tree 206. Container 212 includes a single element "F", which is container 212's label field value and is a prefix of a sequence of elements "F" that is represented by container 212. Container 212's length field value is one, which is the length of the sequence of elements "F" that is represented by container 212. Container 214 includes a single element "G", which is container 214's label field value and is a prefix of a sequence of elements "G" that is represented by container 214. Container 214's length field value is one, which is the length of the sequence of elements "G" that is represented by container 214.

Container 208 has a single immediate child, container 215, which is located at a depth of two in initial radix tree 206. Container 215 includes a single element "E", which is container 215's label field value and is a prefix of a sequence of elements "E" that is represented by container 215. Container 215's length field value is one, which is the length of the sequence of elements "E" that is represented by container 215. Container 215 has a single immediate child, container 216, which is located at a depth of three in initial radix tree 206. Container 216 includes a single element "H", which is container 216's label field value and is a prefix of a sequence of elements "H" that is represented by container 216. Container 216's length field value is one, which is the length of the sequence of elements "H" that is represented by container 216. Container 216 has a single immediate child, container 217, which is located at a depth of four in initial radix tree 206. Container 217 includes a single element "J", which is container 217's label field value and is a prefix of a sequence of elements "J" that is represented by container 217. Container 217's length field value is one, which is the length of the sequence of elements "J" that is represented by container 217. Containers 212, 214, and 217 are leaf containers because they have no children.

Initial radix tree 206 may store three keys. In an example, a first key "ABDF" is stored in containers 202, 204, 210, and 212. Container 212 may map to a value that is associated with the first key (not shown). A second key "ABDG" is stored in containers 202, 204, 210, and 214. Container 214 maps to a value that is associated with the second key (not shown). A third key "AWEHJ" is stored in containers 202, 208, 215, 216, and 217. Container 217 maps to a value that is associated with the third key (not shown). In another example, initial radix tree 206 stores the prefix of one or more keys and stores more elements than that shown in FIG. 2A. For example, initial radix tree 206 stores a key "ABDFR" and only the first four elements of the key are shown in FIG. 2A (e.g., in containers 202, 204, 210, and 212).

B. Traverse the Radix Tree

Radix tree compressor includes a traverser 112 and a compressor 114. When a lookup for a key in a radix tree occurs, traverser 112 may traverse the radix tree to search for the key. Traverser 112 may traverse initial radix tree 206 container by container and identify the element included in one or more traversed containers. Traverser 112 may traverse initial radix tree 206 from root container 202 towards a leaf container of the radix tree. A traversal of a compressed radix tree is described in U.S. patent application Ser. No. 14/272,445 to Tsirkin et al., filed May 7, 2014, entitled "Lookup with Key Sequence Skip for Radix Tree," which is incorporated herein by reference in its entirely.

In an example, traverser 112 starts from the root container, which may store a first set of elements of the key that is being searched for. Traverser 112 then looks at the root container's children to search for the next sequence of one or more elements in the searched-for key after the first set of elements included in the root container. A leaf container may be associated with a value to which the key is mapped. In an embodiment, a leaf container of a key identifies a value to which the key maps, and the value is associated with the key. Traverser 112 may look in the leaf container to identify the value to which the key maps. In an example, the value may be inserted in the leaf container. In another example, the leaf container references or points to the value.

Traverser 112 may traverse the containers in initial radix tree 206 such that a parent of a given container is traversed before the given container is traversed. In an example, traverser 112 traverses initial radix tree 206 from top (e.g., root container 202) down to a child container of the root container and continues to traverse the descendants of that child container until a leaf container is traversed. In such an example, traverser 112 may traverse root container 202, container 204 (a child of root container 202), container 210, and leaf container 212 (a descendant and child of container 204). If a container has more than one child, traverser 112 may traverse the container's other children. For example, after traversing container 204, traverser 112 may traverse container 208 (the other child of root container 202) and any children that container 208 may have. For example, after traversing container 208, traverser 112 may traverse containers 215, 216, and 217, which are descendants of container 202.

In another example, traverser 112 starts at root container 202 at depth zero, goes down the next depth level and traverses each container at that depth level, and continues to go down one depth level at a time and traverse each container at that particular depth level before moving on to the next depth level. In such an example, traverser 112 may start at root container 202 at depth zero, traverse down to each of the containers at depth one (e.g., containers 204 and 208), then traverse down to each of the containers at depth two (e.g., containers 210 and 215), then traverse down to each of the containers at depth three (e.g., containers 212, 216, and 216), and then traverse down to each of the containers at depth four (e.g., container 217). Accordingly, containers having a smaller depth are traversed before containers having a larger depth in initial radix tree 206. In other words, containers that are located closer to the root container are traversed before containers that are located farther from the root container. In such a traversal, the containers closer to the root node may store more elements than the containers farther from the root node. This, however, depends on how many children the containers have, as will be explained in further detail in the disclosure.

C. Compress the Radix Tree
I. Identify Containers to Combine

Radix tree compressor 110 may receive an instruction to compress initial radix tree 206. When the instruction to compress initial radix tree 206 is received, traverser 112 may traverse the radix tree to identify containers in the radix tree to combine and/or remove. Traverser 112 may traverse initial radix tree 206 from root node 202 toward a leaf node of initial radix tree 206.

In the example illustrated in FIG. 2A, each container in initial radix tree 206 includes a single element, and the length of each set of elements included in a container is one. Accordingly, the amount of memory that each container takes up is small and limited. Further, initial radix tree 206 has a depth of four. It may be desirable to compress initial radix tree 206 such that its depth is reduced. By reducing initial radix tree 206's depth, it may take fewer steps to determine whether a key or a key's prefix is stored in initial radix tree 206. Accordingly, searching of the compressed radix tree may be improved and the search time reduced, thus improving performance. For example, lookup time may be minimized and the number of memory accesses required during lookup reduced. Additionally, the size of initial radix tree 206 may be reduced such that it contains fewer containers.

In an embodiment, traverser 112 identifies, based on the traversal of initial radix tree 206, a parent container that represents a sequence of elements and has a single immediate child container, where the parent container includes a prefix of the sequence of elements and the immediate child container includes a single element. Traverser 112 may traverse initial radix tree 206 until all of the containers are traversed, until most containers are traversed, until a particular number of containers are traversed, and/or until containers at a particular depth have been traversed.

When traverser 112 traverses root container 202, traverser 112 may determine how many children root container 202 has. As illustrated in the example in FIG. 2A, root container 202 has two immediate children. Because root container 202 does not have a single immediate child container (rather, root container 202 has two immediate child containers), root container 202 will not be combined with another container. Traverser 112 may continue down initial radix tree 206 and identify one or more of container 202's child containers. In particular, traverser 112 may go on to traverse container 204 and its children, and go on to traverse container 208 and its children. Although traverser 112 may be described as traversing container 204 and its descendants down to leaf containers 212 and 214 before traversing containers 208 and its children, this is not intended to be limiting and traverser 112 may traverse the containers in any order. For example, in another embodiment, traverser 112 traverses all of the containers at a particular depth level before traversing the containers located at a level below the particular depth level.

In an embodiment, compressor 114 determines whether a length of the sequence of elements that is represented by the parent container satisfies a container threshold. The container threshold may refer to the maximum number of elements that a container may represent. For example, if a container's container threshold is two, then the container may represent at most two elements. In an example, each container in initial radix tree 206 has the same container threshold. In another example, two containers in initial radix tree 206 have different container thresholds. In such an example, the container threshold of a container may depend on, for example, the depth level of the container.

The length of the sequence of elements that is represented by the parent container may satisfy the container threshold based on different conditions. In an example, when the length of the sequence of elements that is represented by the parent container does not exceed the container threshold, the length of the sequence of elements satisfies the container threshold. In another example, when the length of the sequence of elements that is represented by the parent container is less than the container threshold, the length of the sequence of elements satisfies the container threshold. In another example, when a sum of the length of the sequence of elements that is represented by the parent container and the length of the child container does not exceed the container threshold, the length of the sequence of elements satisfies the threshold. Other ways in which to compare the length of the sequence of elements that is represented by the parent container to the container threshold are within the scope of the disclosure. The container threshold may be set in accordance with the particular embodiment and how the length of the sequence of elements is compared to the container threshold.

When the length of the sequence of elements that is represented by the parent container is determined to satisfy the container threshold, compressor 114 selects one of the parent container and child container, increments a length of the selected container, and removes the non-selected container from the radix tree. In the example illustrated in FIG. 2A, traverser 112 may traverse container 204, and identify container 204 as being a parent container that represents a sequence of elements (e.g., sequence of elements "B") and also as having a single immediate child container (e.g., container 210). Container 204 includes a prefix of the sequence of elements "B" that is represented by container 204, and container 210 includes a single element "D".

In an example, the container threshold is two, and when the length of the sequence of elements that is represented by a parent container is less than the container threshold, the length of the sequence of elements that is represented by the parent container satisfies the container threshold. The length of the sequence of elements that is represented by parent container 204 is one, the value of container 204's length field. In such an example, compressor 114 determines whether the length of the sequence of elements that is represented by parent container 204 (e.g., one) is less than two, the container threshold. The length of the sequence of elements that is represented by parent container 204 is less than two. Accordingly, the length of the sequence of elements that is represented by container 204 satisfies the container threshold.

When compressor 114 determines that the length of the sequence of elements that is represented by container 204 does not satisfy the container threshold, traverser 112 may traverse another container. When compressor 114 determines that the length of the sequence of elements that is represented by container 204 satisfies the container threshold, compressor 114 selects one of container 204 and container 210, increments a length of the selected container, and removes the non-selected container from initial radix tree 206. In an embodiment, compressor 114 inserts the single element included in the immediate child container into an auxiliary data structure and stores a reference from the selected container to the auxiliary data structure. In an example, compressor 114 stores the single element in an entry in auxiliary data structure 233 and stores a reference from the selected container to the entry in the auxiliary data structure.

It is advantageous for compressor 114 to know that the traversed containers in initial radix tree 206 include only a single element. Accordingly, once compressor 114 determines that the length of the sequence of elements that is represented by the parent container satisfies the container threshold, compressor 114 may automatically select one of the parent container and child container, increment a length of the selected container, and remove the non-selected container from the radix tree. It may be unnecessary for compressor 114 to determine a sum of the parent container's length and the immediate child container's length because the parent container's length will be extended by only a single element. This may save time and processing power.

2. The Parent Container is Selected

In an example, compressor 114 selects the parent container, which makes the immediate child container of the parent container the non-selected container. In such an example, compressor 114 selects container 204 and increments a length of container 204 by incrementing the length of the sequence of elements that is represented by container 204 by one. For example, compressor 114 may increment a length of container 204 by incrementing container 204's length by one. As illustrated in FIG. 2B, container 204's length is incremented by one to incorporate container 210's length of one. Accordingly, in FIG. 2B, the length of the sequence of elements that is represented by parent container 204 is two, the value of container 204's length field.

Additionally, compressor 114 removes container 210, the non-selected container, from initial radix tree 206. As illustrated in FIG. 2B, container 210 has been removed from initial radix tree 206, and intermediate radix tree 218 does not include container 210. In an embodiment, compressor 114 inserts the single element "D" included in container 210 into an auxiliary data structure 233 and stores a reference 240 from the selected container, container 210, to auxiliary data structure 233. Auxiliary data structure 233 stores one or more elements included in a container. A container in the radix tree may reference an entry in the auxiliary data structure, which may be any data structure that is capable of storing one or more elements. The auxiliary data structure may be, for example, a table, array, binary tree, or other data structure. In another embodiment, auxiliary data structure 233 is not used and the element included in the immediate child container is discarded when the immediate child container is removed. Regardless of whether auxiliary data structure 233 is used, element "D"'s position in the sequence of elements stored in intermediate radix tree 218 is held by incrementing container 204's length, indicating that one element is after the prefix "B".

Removing a given immediate child container from the radix tree may cause the ancestry relationships of the containers in the radix tree to be rearranged. For example, in initial radix tree 206, a given immediate child container may have a set of one or more immediate child containers. The set of immediate child containers should no longer descend from the given immediate child container because it has been removed from the radix tree and should instead descend from the parent container of the given immediate child container.

In an embodiment, compressor 114 determines whether a given immediate child container (e.g., the immediate child container to be removed) of a parent container is a leaf container. In an example, when the given immediate child container is determined to be a leaf container, compressor 114 may mark the given immediate child container as a leaf container. In another example, when the given immediate child container is determined to be a leaf container, compressor 114 does nothing and traverser 112 continues traversing the remaining containers.

In contrast, when the given immediate child container is determined to not be a leaf container, compressor 114 may identify a set of one or more immediate child containers of the given immediate child container. Compressor 114 may replace the given immediate child container with the parent container as the parent of the set of one or more immediate child containers. In FIG. 2A, compressor 114 may identify containers 212 and 214 as immediate child containers of container 210. As illustrated in FIG. 2B, compressor 114 may replace container 210 with container 204 as the parent of containers 212 and 214. In such a scenario in which the given immediate child container is determined to not be a leaf container, the set of one or more immediate child containers becomes the immediate child containers of the parent container such that a single edge connects the parent container to each of the containers in the set of one or more immediate child containers. The descendants of the given immediate child container become the descendants of the parent container one level closer to the parent container. Incrementing the parent container's length count and removing the immediate child container in this fashion may provide a faster lookup of keys or key prefixes that are not stored in the radix tree.

3. Continue the Traversal of the Radix Tree

Container 204 has two immediate children, containers 212 and 214, which are leaf containers. Thus, neither of these containers has a single immediate child container. Traverser 112 may go on to traverse container 208. In the example illustrated in FIG. 2B, traverser 112 may traverse container 208, and identify container 208 as being a parent container that represents a sequence of elements (e.g., sequence of elements "W") and also as having a single immediate child container (e.g., container 215). Container 208 includes a prefix of the sequence of elements "W" that is represented by container 208, and container 215 includes a single element "E".

In keeping with the above example, the container threshold is two, and when the length of the sequence of elements that is represented by a parent container is less than the container threshold, the length of the sequence of elements that is represented by the parent container satisfies the container threshold. The length of the sequence of elements that is represented by parent container 208 is one, the value of container 208's length field. In such an example, compressor 114 determines whether the length of the sequence of elements that is represented by parent container 208 (e.g., one) is less than two, the container threshold. The length of the sequence of elements that is represented by parent container 208 is less than two. Accordingly, the length of the sequence of elements that is represented by container 208 satisfies the container threshold.

4. The Immediate Child Container is Selected

In an example, compressor 114 selects the immediate child container, which makes the parent container of the immediate child container the non-selected container. In such an example, compressor 114 selects container 215 (the single immediate child container of container 208) and increments a length of container 215 by the length of the sequence of elements that is represented by the parent container, which is container 208. Compressor 114 may increment a length of container 215 by incrementing container 215's length by one, which is container 208's length. Further, when compressor 114 selects container 215, compressor 114 replaces the prefix of container 215 with the prefix of container 208. As illustrated in FIG. 2C, container 215's length is incremented by one to incorporate container 208's length of one. Accordingly, in FIG. 2C, the length of the sequence of elements that is represented by immediate child container is two, the value of container 215's length field, and the new prefix of container 215 is "W", which is the prefix of container 208.

Additionally, compressor 114 removes container 208, the non-selected container, from the radix tree. As illustrated in FIG. 2C, container 208 has been removed from intermediate radix tree 218, and intermediate radix tree 242 does not include container 208. In an embodiment, compressor 114 inserts the single element "E" included in container 215 into auxiliary data structure 233 and stores a reference 244 from the selected container, container 215, to auxiliary data structure 233. Regardless of whether auxiliary data structure 233 is used, element "E"'s position in the sequence of elements stored in intermediate radix tree 242 is held by incrementing container 215's length, indicating that one element is after the prefix "W".

Removing the immediate child container from the radix tree may cause the ancestry relationships of the containers in the radix tree to be rearranged. For example, in intermediate radix tree 218, a first parent container (e.g., the parent container to be removed) may be the immediate child of a second parent container. The first parent container may be container 208, which is an immediate child of container 202 and has container 215 as an immediate child. The immediate child container (e.g., container 215) should no longer descend from the first parent container (e.g., container 208) because it has been removed or will be removed from the radix tree. The immediate child container (e.g., container 215) should instead descend from the second parent container (e.g., container 202), which is the parent of the first parent container that is to be removed.

In an embodiment, compressor 114 determines whether a first parent container is an immediate child of a second parent container, where the first parent container is the non-selected container and is to be removed from the radix tree. When the first parent container is determined to not be an immediate child of a second parent container, the first parent container may be a root node of the radix tree. In an example, when the first parent container is determined to not be an immediate child of a second parent container, compressor 114 may mark the immediate child of the first parent container as the root node of the radix tree. In another example, when the first parent container is determined to not be an immediate child of a second parent container, compressor 114 may do nothing and traverser 112 may continue traversing the remaining containers.

In contrast, when the first parent container is determined to be an immediate child of the second parent container, compressor 114 may identify a set of one or more immediate child containers of the immediate child container of the first parent container. The set of one or more immediate child containers may be located two depth levels below the first parent container. Compressor 114 may replace the first parent container with the second parent container as the parent of the immediate child container.

In FIG. 2B, compressor 114 may identify container 215 as an immediate child of container 208 and may identify container 208 as an immediate child of container 202. As illustrated in FIG. 2C, compressor 114 may replace container 208 with container 202 as the parent of container 215. In such a scenario in which the first parent container is to be removed and is an immediate child of a second parent container, the immediate child container of the first parent container becomes the immediate child of the second parent container such that a single edge connects the second parent container to the immediate child container. The descendants of the immediate child container become the descendants of the second parent container one level closer to the second parent container. Incrementing the immediate child container's length count and removing the first parent container in this fashion may provide a faster lookup of keys or key prefixes that are not stored in the radix tree.

Compressor 114 may make other determinations before removing the non-selected container from initial radix tree 206. In an example, a container may include a value. Compressor 114 may determine whether the parent container has a value before combining the parent and child containers into a single container. In such an example, when the length of the first set of elements included in the parent container is determined to satisfy the threshold and when the parent container is determined to not have a value, compressor 114 combines the parent and child containers into a single container. Additionally, if the child container (e.g., leaf container) includes a value, compressor 114 may insert the value into the single container. If the child container (e.g., leaf container) includes a reference to the value, compressor 114 may insert the reference into the single container.

5. Continue the Traversal of the Radix Tree

Container 215 is a parent container that has a single immediate child container. Compressor 114 determines whether a length of the sequence of elements that is represented by container 215 satisfies a container threshold. In keeping with the above example, the container threshold is two, and when the length of the sequence of elements that is represented by a parent container is less than the container threshold, the length of the sequence of elements that is represented by the parent container satisfies the container threshold. The length of the sequence of elements that is represented by container 215 is two, the value of container 215's length field. In such an example, compressor 114 determines whether the length of the sequence of elements that is represented by container 215 (e.g., two) is less than two, the container threshold. The length of the sequence of elements that is represented by parent container 215 is not less than two. Accordingly, the length of the sequence of elements that is represented by container 215 does not satisfy the container threshold.

Traverser 112 may go on to traverse container 215's child, container 216. Container 216 has a single immediate child container, which is container 217. Compressor 114 may perform the actions as described in the disclosure to compress intermediate radix tree 242. For example, compressor 114 increments the length of container 216 by one in order to incorporate container 217's length of one and also removes container 217 from the radix tree. As illustrated in FIG. 2D, the length of the sequence of elements that is represented by container 216 is two, container 216's length, and container 217 is no longer in the radix tree. Compressor 114 may also inserting the single element "J" included in container 217 into auxiliary data structure 233 and store a reference 248 from container 216 to auxiliary data structure 233. No more containers are left to traverse in compressed radix tree 280.

FIG. 2A illustrates an example initial radix tree 206 having nine containers and a depth of four. FIG. 2D illustrates a resulting compressed radix tree after compressor 114 compresses initial radix tree 206 to thereby create compressed radix tree 280. In FIG. 2D, compressed radix tree 280 stores a subset of the elements that make up the three keys stored in FIG. 2A. In FIG. 2D, compressed radix tree 280 has six containers and a depth of two. In the examples illustrated in FIGS. 2A-2D, compressor 114 reduces initial radix tree 206's depth by two (e.g., from a depth of four to two) and the number of containers by three (e.g., from nine to six containers). Thus, compressed radix tree 280 may provide a faster lookup of keys that are not stored in the radix tree as compared to initial radix tree 206. Additionally, when traverser 112 traverses compressed radix tree 280 to determine whether it stores a particular key or key prefix, compressed radix tree 280 has a shallower depth than initial radix tree 206 and thus traverser 112 traverses down fewer levels to make this determination as compared to traversing initial radix tree 206 to search for a key or key prefix.

As discussed above and further emphasized here, FIGS. 1 and 2A-2D are merely examples, which should not unduly limit the scope of the claims. For example, it should be understood that one or more modules may be combined with another module. In an example, traverser 112 may be combined with compressor 114. It should also be understood that a module may be separated into more than one module. In an example, compressor 114 may be separated into a first compressor module and a second compressor module.

Additionally, the prefix threshold may be any number greater than one. For example, the prefix threshold may be three, four, five, or greater. It may be desirable, however, to limit the elements included in a single container such that each container does not consume too much memory. It should also be understood that the prefix threshold may be different for different containers. For example, the prefix threshold of a container may depend on a depth of the container in the radix tree.

Additionally, the container threshold may be any number greater than one. For example, the container threshold may be three, four, five, or greater. It may be desirable, however, to limit the elements included in a single container such that not too many elements of a key are skipped. The smaller the container threshold, the more accurate the search of the radix tree may be. The larger the container threshold, however, the less memory may be consumed by the radix tree and the shallower the depth of the compressed radix tree may be. It should also be understood that the container threshold may be different for different containers. For example, the container threshold of a container may depend on a depth of the container in the radix tree.

Additionally, although the elements have been illustrated in FIGS. 2A-2D as being letters, it should be understood that this is not intended to be limiting. Other embodiments in which an element is different from a letter is within the scope of the disclosure. For example, one or more containers may include bits or other symbols.

III. Example Method

Figure 3:
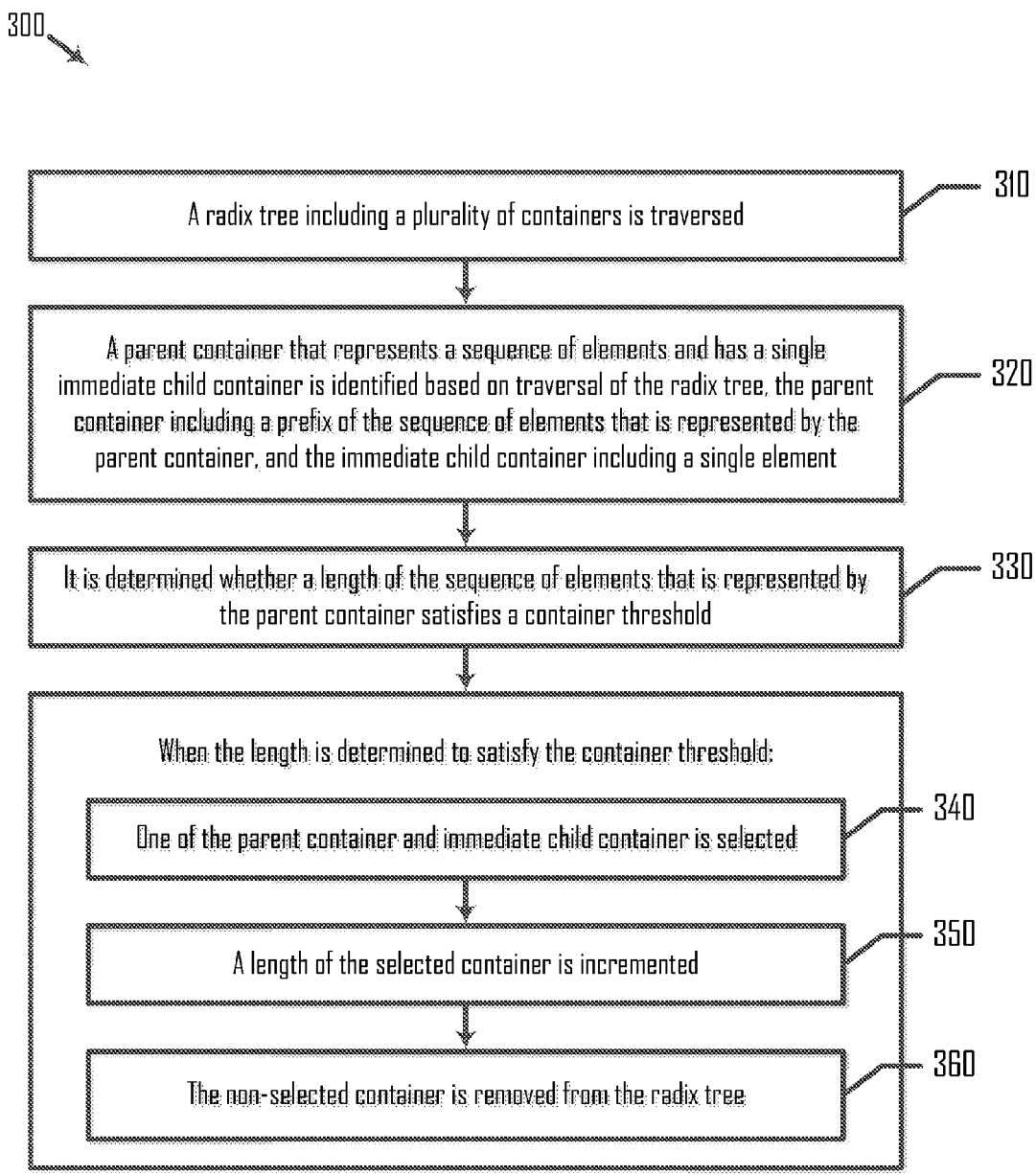
FIG. 3 is a flowchart illustrating a method of compressing a radix tree including a plurality of containers, according to an embodiment.

FIG. 3 is a flowchart illustrating a method 300 of compressing a radix tree including a plurality of containers, according to an embodiment. Method 300 is not meant to be limiting and may be used in other applications.

Method 300 includes actions 310-360. In an action 310, a radix tree including a plurality of containers is traversed. In an example, traverser 112 traverses initial radix tree 206 including containers 202-217 in FIG. 2A. Initial radix tree 206 may store one or more keys or key prefixes. Initial radix tree 206 includes nine containers and has a depth of four. Retriever 104 or radix tree compressor 110 may receive an instruction to compress initial radix tree 206. Each container in initial radix tree 206 stores a single element that may make up part of a key.

In an action 320, a parent container that represents a sequence of elements and has a single immediate child container is identifies based on traversal of the radix tree, the parent container including a prefix of the sequence of elements that is represented by the parent container, and the immediate child container including a single element. In the example illustrated in FIG. 2A, traverser 112 may identify, based on traversing initial radix tree 206, container 204 as a parent container that represents a sequence of elements (e.g., B) and has a single immediate child container (e.g., container 210), container 204 including a prefix of the sequence of elements that is represented by container 204, and container 210 including a single element "D". Container 210 represents one element, "D".

In an action 330, it is determined whether a length of the sequence of elements that is represented by the parent container satisfies a container threshold. In the example illustrated in FIG. 2A, compressor 114 may determine whether a length of the sequence of elements that is represented by container 204, the parent of container 210, satisfies a container threshold. In an example, the container threshold is two and when the length of the sequence of elements that is represented by container 204 is less than the container threshold, the length of the sequence of elements that is represented by container 204 satisfies the container threshold. In such an example, the length of the sequence of elements that container 204 represents is one, less than the container threshold of two. Thus, compressor 114 determines that the length of the sequence of elements that is represented by container 204 satisfies the container threshold.

When the length is determined to satisfy the container threshold, actions 340-360 are performed. In an action 340, one of the parent container and immediate child container is selected. In an action 350, a length of the selected container is incremented. In an action 360, the non-selected container is removed from the radix tree.

In an example, compressor 114 selects container 204, the parent container. In such an example, container 210, the immediate child of container 204, is the non-selected container. Compressor 114 may increment container 204's length, which is the length of the sequence of elements that is represented by container 204, by one. Compressor 114 may also remove container 210 from the radix tree. To adjust the ancestry relationship in the radix tree, compressor 114 may determine whether container 210 is a leaf container. When container 210 is determined to not be a leaf container, compressor 114 may identify a set of one or more immediate child containers of container 210 and replace the container 210 with container 204 as the parent of the set of one or more immediate child containers (see FIG. 2B).

In another example, compressor 114 selects container 210, the immediate child container of container 204. In such an example, container 204, the parent of container 210, is the non-selected container. Compressor 114 may increment container 210's length, which is the length of the sequence of elements that is represented by container 210, by the length of the sequence of elements that is represented by container 204. Compressor 114 may also replace a prefix of container 210 with the prefix of container 204 and remove container 204 from the radix tree. To adjust the ancestry relationship in the radix tree, compressor 114 may determine whether container 204 is an immediate child of a second parent container. In FIG. 2A, container 204 is an immediate child of container 202. When container 204 is determined to be an immediate child of the second parent container, compressor 114 replaces the container 204 with the second parent container as the parent of container 210.

It is also understood that additional processes may be performed before, during, or after actions 310-360 discussed above. It is also understood that one or more of the actions of method 300 described herein may be omitted, combined, or performed in a different sequence as desired. In an example, actions 310-360 are applied to one or more (or all) containers at each depth level of a radix tree to compress the radix tree.

IV. Example Computing System

Figure 4:
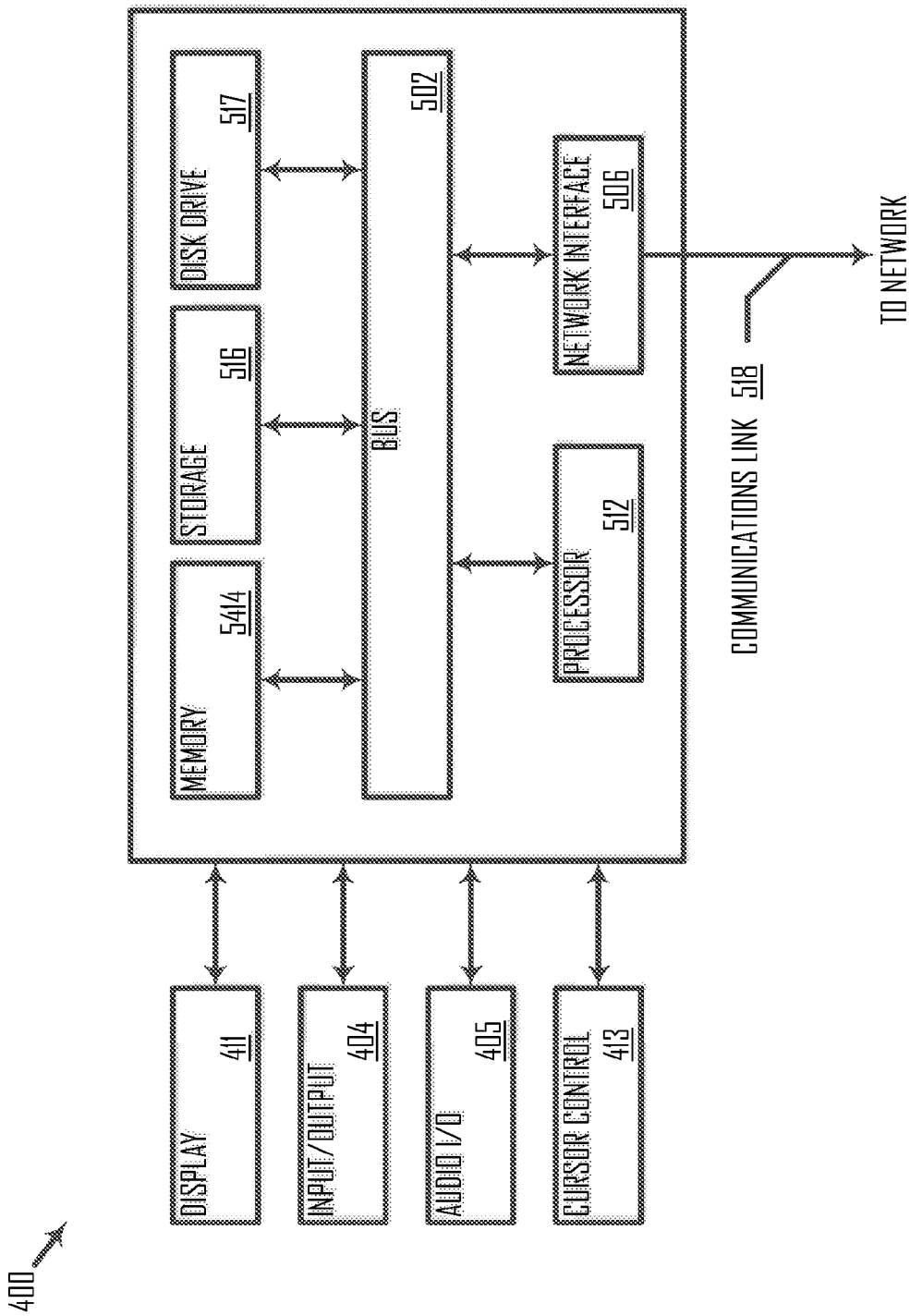
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a micro-controller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of compressing a radix tree including a plurality of containers, comprising:
   traversing a radix tree including a plurality of containers;
   identifying, based on the traversing, a parent container that represents a sequence of elements and has a single immediate child container, the parent container including a prefix of the sequence of elements that is represented by the parent container, and the immediate child container including a single element;
   determining whether a length of the sequence of elements that is represented by the parent container satisfies a container threshold; and
   when the length is determined to satisfy the container threshold:
      selecting one of the parent container and immediate child container;
      incrementing a length of the selected container; and
      removing the non-selected container from the radix tree.

2. The method of claim 1, wherein when the length of the sequence of elements that is represented by the parent container is less than the container threshold, the length of the sequence of elements satisfies the container threshold.

3. The method of claim 1, wherein when the length of the sequence of elements that is represented by the parent container does not exceed the container threshold, the length of the sequence of elements satisfies the container threshold.

4. The method of claim 1, wherein the traversing includes traversing from a root node of the radix tree toward a leaf node of the radix tree.

5. The method of claim 1, further including:
receiving an instruction to compress the radix tree.

6. The method of claim 1, further including:
inserting the single element included in the immediate child container into an auxiliary data structure; and
storing a reference from the immediate child container to the auxiliary data structure.

7. The method of claim 1, wherein when the parent container is selected, the incrementing includes incrementing the length of the sequence of elements that is represented by the parent container by one.

8. The method of claim 7, further including:
determining whether the immediate child container is a leaf container; and
when the immediate child container is determined to not be a leaf container:
identifying a set of one or more immediate child containers of the immediate child container; and
replacing the immediate child container with the parent container as the parent of the set of one or more immediate child containers.

9. The method of claim 1, wherein when the immediate child container is selected, the incrementing includes incrementing a length of the immediate child container by the length of the sequence of elements that is represented by the parent container.

10. The method of claim 9, wherein the immediate child container is selected, the method further including:
replacing a prefix of the immediate child container with the prefix of the parent container.

11. The method of claim 10, further including:
determining whether the first parent container is an immediate child of a second parent container; and
when the first parent container is determined to be an immediate child of the second parent container, replacing the first parent container with the second parent container as the parent of the immediate child container.

12. A system for compressing a radix tree including a plurality of containers, comprising:
a traverser that traverses a radix tree including a plurality of containers and identifies, based on the traversal of the radix tree, a parent container that represents a sequence of elements and has a single immediate child container, wherein the parent container includes a prefix of the sequence of elements that is represented by the parent container, and the immediate child container includes a single element; and
a compressor that determines whether a length of the sequence of elements that is represented by the parent container satisfies a container threshold, wherein when the length is determined to satisfy the container threshold, the compressor selects one of the parent container and immediate child container, increments a length of the selected container, and removes the non-selected container from the radix tree.

13. The system of claim 12, wherein when the length of the sequence of elements that is represented by the parent container does not exceed the container threshold, the length of the sequence of elements satisfies the container threshold.

14. The system of claim 12, wherein the compressor inserts the single element included in the immediate child container into an auxiliary data structure and stores a reference from the immediate child container to the auxiliary data structure.

15. The system of claim 12, wherein when the compressor selects the parent container, the compressor increments the length of the sequence of elements that is represented by the parent container by one.

16. The system of claim 15, wherein when the compressor selects the parent container, the compressor determines whether the immediate child container is a leaf container, and wherein when the immediate child container is determined to not be a leaf container, the compressor identifies a set of one or more immediate child containers of the immediate child container and replaces the immediate child container with the parent container as the parent of the set of one or more immediate child containers.

17. The system of claim 12, wherein when the compressor selects the immediate child container, the compressor increments a length of the immediate child container by the length of the sequence of elements that is represented by the parent container.

18. The system of claim 17, wherein when the compressor selects the immediate child container, the compressor replaces a prefix of the immediate child container with the prefix of the parent container.

19. The system of claim 18, wherein when the compressor selects the immediate child container, the compressor determines whether the first parent container is an immediate child of a second parent container, and wherein when the first parent container is determined to be an immediate child of the second parent container, the compressor replaces the first parent container with the second parent container as the parent of the immediate child container.

20. A machine-readable medium comprising a plurality of machine-readable instructions that when executed by one or more processors is adapted to cause the one or more processors to perform a method comprising:
traversing a radix tree including a plurality of containers;
identifying, based on the traversing, a parent container that represents a sequence of elements and has a single immediate child container, the parent container including a prefix of the sequence of elements that is represented by the parent container, and the immediate child container including a single element;
determining whether a length of the sequence of elements that is represented by the parent container satisfies a container threshold; and
when the length is determined to satisfy the container threshold:
selecting one of the parent container and immediate child container;
incrementing a length of the selected container; and
removing the non-selected container from the radix tree.

* * * * *